June 17, 1930. A. C. HAYDEN 1,764,721
SUPPORT FOR PANORAMIC CAMERAS
Filed Nov. 13, 1926 2 Sheets-Sheet 2
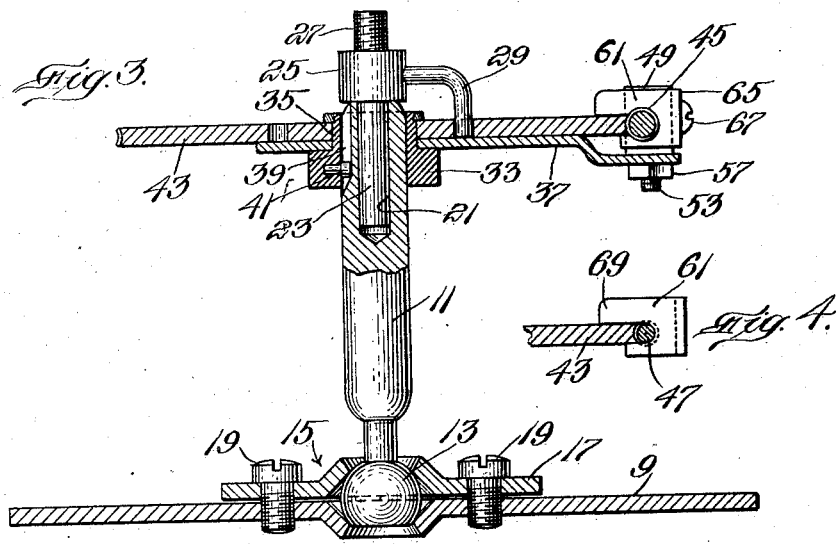
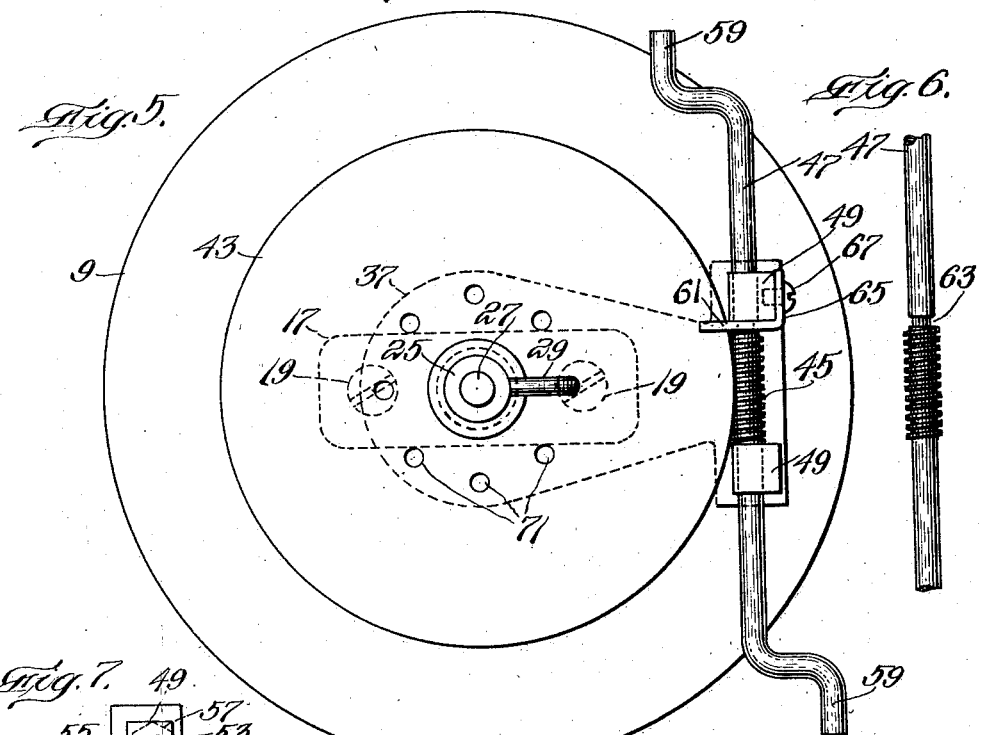
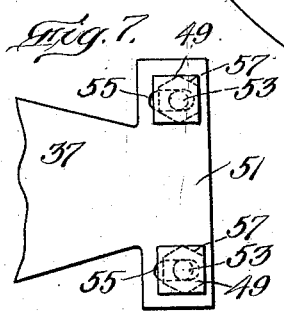
Inventor:
Arthur C. Hayden,
by Henry T. Williams,
Atty Patented June 17, 1930

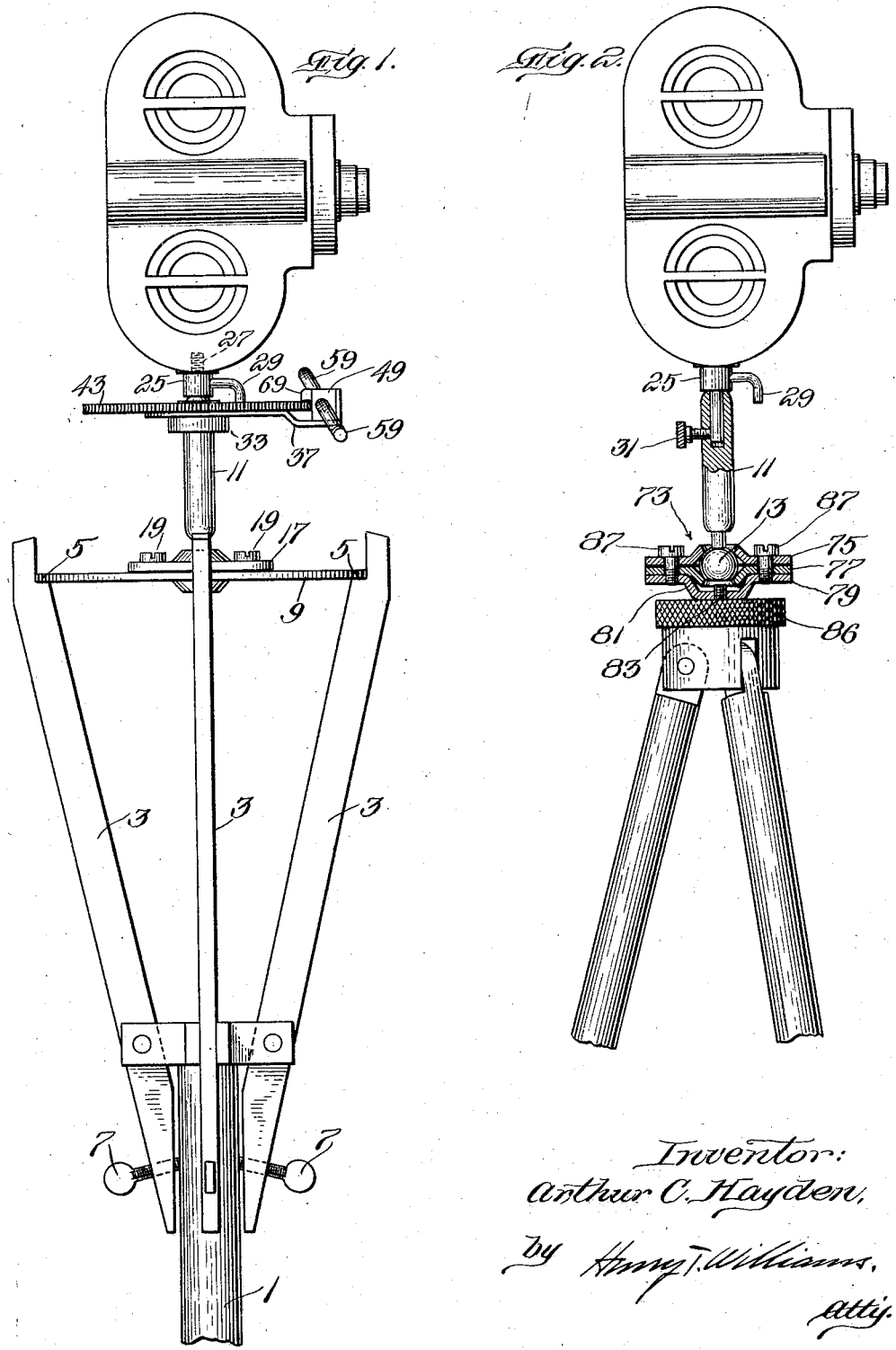

1,764,721

UNITED STATES PATENT OFFICE

ARTHUR C. HAYDEN, OF BROCKTON, MASSACHUSETTS

SUPPORT FOR PANORAMIC CAMERAS

Application filed November 13, 1926. Serial No. 148,224.

The invention to be hereinafter described relates to supports for cameras and the like.

In positioning a camera it is frequently desirable that it may be moved to different positions of angular adjustment, and this is particularly true when pictures are to be taken out-of-doors. The usual stand for supporting the camera is in the form of a tripod, and if attempt is made to position the camera properly by moving one or more of the legs of the tripod, there is danger that the tripod will tip over with consequent liability of injury to the camera. One of the features of the present invention, therefore, is a support for a camera which enables the latter to be angularly adjusted as desired without disturbing the legs of the tripod.

Heretofore panoramic motion pictures have been taken by holding the camera in the hands of the operator and gradually swinging the same through an arc of desired extent. It is impossible in this fashion to swing the camera at a uniform rate, and the operator is liable to move the camera so rapidly that indistinct photographs are taken, and sometimes they are badly blurred. Another feature of the invention, therefore, is a camera support provided with mechanical means for slowly and gradually swinging the camera with a measured uniform movement.

Still another feature of the invention is a support which may be tilted as desired and frictionally held in the position to which it is adjusted, and provided with a detachable unit which may be employed when it is desired to take panoramic photographs. The construction is such that the support may be tilted when either a stationary camera or a camera for taking panoramic photographs is used.

The character of the invention may be best understood by reference to the following description of embodiments thereof shown in the accompanying drawings, wherein:

Fig. 1 is a side elevation of the upper portion of a stand on which is mounted a camera support embodying the invention;

Fig. 2 is a side elevation of the upper portion of a tripod and a camera support thereon which is a modified form of the invention, parts thereof being shown in section;

Fig. 3 on an enlarged scale is a view of the support shown in Fig. 1, partly in section and partly in elevation;

Fig. 4 is a sectional detail to be referred to;

Fig. 5 is a plan of the support shown in Fig. 3;

Fig. 6 is a view of a portion of the worm shaft; and

Fig. 7 is a plan of a portion of the worm and worm gear supporting plate and showing the provision for adjusting the worm toward or from the worm gear.

Referring to the drawings, 1 (Fig. 1) designates the upper portion of the post of a stand which may desirably be constructed as disclosed in my copending application Serial No. 137,858, filed September 27, 1926. Pivotally connected to the upper ends of the post are arms 3 having notch seats 5 at the upper ends thereof, said arms being provided adjacent their lower ends with adjusting screws 7 having ends for engagement with the post.

The support shown in Figs. 1 and 3 to 7, comprises a base conveniently in the form of a disk and adapted to rest in the seats 5 of the stand and be firmly secured therein by adjustment of the screws 7.

Rising from the base 9 is a stud 11 having a ball 13 at the lower end thereof mounted in a socket 15, the lower half thereof being formed in the base 9 and the upper half thereof being formed in a bar 17 secured to the base by screws 19. The construction is such that the screws may be adjusted in order that the bar 17 shall press against the ball sufficiently to give the desired friction between the ball and the socket to hold the stud in the different angular positions to which it may be adjusted.

At the upper end of the stud is a socket 21 adapted to receive a pin 23 having a boss 25 adapted to rest on the upper end of the stud. Projecting above the flange is a threaded portion 27 adapted to be screwed into the usual threaded hole at the bottom of the motion picture camera. Secured to and projecting laterally from the boss 25 is a downwardly turned finger 29 for a purpose to be described.

The pin 23 may be secured in the socket 21 by a set screw 31 (Fig. 2).

When it is desired to take panoramic photographs, a unit may be mounted on the upper end of the stud 11 comprising a sleeve 33 having a reduced upper end 35 projecting through a hole in a plate 37. The stud has a keyway 39 at the upper end thereof adapted to receive a key 41 in the form of a screw in the sleeve. The construction is such that the unit may be quickly and easily slid onto or off from the stud, and when on the latter, rotation of the sleeve with respect to the stud is prevented by the key and keyway.

The reduced upper end of the sleeve projects through the central hole of a worm gear 43 which rests upon the plate 37. Meshing with the gear is a worm 45 on a shaft 47 journalled in bearings in a pair of blocks 49 which are mounted on a portion 51 of the plate 37 which projects beyond the periphery of the gear. It is desirable that these blocks may be adjusted relatively to the plate, and to accomplish this the blocks have threaded studs 53 (Fig. 7) which extend down through elongated holes 55 in the plate, nuts 57 being screwed onto the studs. The construction is such that when the nuts are loosened the blocks and worm shaft carried thereby, may be adjusted toward or from the gear in order that the worm and gear may have the desired intermeshing relation. Then the nuts may be tightened thereby to secure the blocks in place. The shaft 47 has cranks 59 (Fig. 5) at opposite ends thereof, either of which may be grasped by the operator when it is desired to rotate the worm and worm gear. A fork 61 (Figs. 3, 4 and 5) has arms in a circumferential groove 63 (Fig. 6) in the worm shaft, and has a flange 65 which is secured by a screw 67 to one of the bearing blocks 49. The construction is such that the fork prevents movement of the shaft longitudinally in its bearings, and the upper arm 69 of the fork overlaps the margin of the worm gear and prevents the same from rising from the plate 37.

A series of holes 71 (Fig. 5) are distributed in a circle in the worm gear and in any one of said holes the pin finger 29, referred to, may be inserted. The construction is such that the camera secured to the pin may be raised slightly to lift the finger out of the gear hole, and then the pin and camera may be given a quick rotative adjustment with respect to the gear to the position desired for commencing taking of the panoramic picture. Thereupon the finger 29 is dropped into the nearest hole in the gear to connect the camera with the gear. Then the operator may grasp one of the cranks 59 and rotate the worm, which in turn imparts rotative movement to the worm gear and camera. The operator continues to turn the crank until the opposite end of the desired arc of movement of the camera is reached.

In some instances it may be desirable that the camera shall be swung through a complete circle. To accomplish this, the operator grasps one of the cranks and rotates the worm shaft until the gear and camera are moved, for example, through an arc of 180°, and then without stopping turning the crank the operator with his other hand grasps the other crank and through it continues the rotation. At the same time he moves around and stands at a position opposite that occupied by him at the commencement of the operation, and thus he avoids standing between the camera and the subjects being photographed.

The support described has the base 9 which is suitable for mounting upon a stand such as disclosed in my copending application referred to. In order that the support may be mounted on an ordinary tripod such as is shown in Fig. 2, the ball 13 may be mounted in a socket 73 having the upper and lower halves thereof formed in bars 75 and 77. Beneath the bar 77 is a bar 79 with an offset portion 81 having a threaded hole adapted to connect with the usual screw 83 on the head 85 of the tripod. A pair of screws 87 extend through registering smooth holes in the bars 75 and 77 and into threaded holes in the bar 79. These screws hold the three bars in assembled relation, and by adjustment thereof the friction between the ball and socket may be varied as desired.

It will be understood that the invention is not limited to the specific embodiment shown, and that various deviations may be made therefrom without departing from the spirit and scope of the appended claims.

What is claimed is:

1. A panoramic camera support comprising a base, a worm and worm gear in driving relation to each other and carried by the base, means to actuate said worm, said gear having a plurality of circumferentially distributed holes therein, and a device swivelly mounted at the axis of the gear and having means for connection with a camera, said device having a finger adapted to be set in any one of the gear holes, thereby to connect the camera with the gear in different positions of rotative adjustment with respect to the gear.

2. A panoramic camera support comprising a base, a stud rising from the base having a socket in the upper end thereof, a worm gear and a worm in driving relation to each other and carried by the stud, means to actuate said worm, said gear having circumferentially distributed holes therein, and a pin in said socket adapted for connection with a camera and having an element adapted to be set in any one of the gear holes thereby to connect the camera to the gear in different positions of rotative adjustment with respect to the gear.

3. A panoramic camera support comprising a base, a plate carried by the base, a worm gear resting on and rotatably mounted on the plate, a worm meshing with said gear, a shaft for the worm, a bearing for the shaft carried by the plate, means for connecting the gear to the camera, a member overlying the margin of the gear to prevent lift of the gear from the plate, and engageable with said shaft to retain same against endwise movement, and a handle for rotating the worm thereby to impart rotative movement to the gear and camera.

4. A panoramic camera support comprising a base, a stud rising from the base, a collar on the stud, a plate fast on the collar, a worm gear journalled on the collar above the plate, a worm on the plate meshing with the worm gear, a handle for rotating the worm, and means for connecting the gear with a camera.

5. A camera support comprising a base, a stud on the base having a keyway at the upper end thereof, a plate having a hole therein for receiving the upper end of the stud and a key adapted to slide into said keyway, a worm and worm gear in driving relation to each other and carried by the plate, means to connect the gear with a camera, and a handle for rotating the worm, thereby to impart rotative movement to the gear and camera.

ARTHUR C. HAYDEN.